(12) United States Patent
Tsironis (10) Patent No.: US 12,517,152 B1
(45) Date of Patent: Jan. 6, 2026

(54) ANTI ABRASION WAFER PROBES

(71) Applicant: Christos Tsironis, St-Laurent (CA)

(72) Inventor: Christos Tsironis, Kirkland (CA)

( * ) Notice: Subject to any disclaimer, the term of this patent is extended or adjusted under 35 U.S.C. 154(b) by 186 days.

(21) Appl. No.: 18/143,165

(22) Filed: May 4, 2023

(51) Int. Cl.
*G01R 1/073* (2006.01)

(52) U.S. Cl.
CPC .................. *G01R 1/07307* (2013.01)

(58) Field of Classification Search
CPC .................................. G01R 1/07307
USPC ....................................... 324/754.03
See application file for complete search history.

(56) References Cited

U.S. PATENT DOCUMENTS

| | | | | |
|---|---|---|---|---|
| 4,697,143 A | * | 9/1987 | Lockwood | G01R 1/06772 324/762.05 |
| 4,827,211 A | * | 5/1989 | Strid | G01R 1/0735 324/72.5 |
| 4,871,964 A | * | 10/1989 | Boll | G01R 1/07342 324/755.05 |
| 5,517,126 A | * | 5/1996 | Yamaguchi | G01R 1/07371 324/750.25 |
| 7,332,923 B2 | * | 2/2008 | Schott | G01R 1/06772 324/754.06 |
| 7,764,072 B2 | * | 7/2010 | Strid | G01R 1/06772 324/149 |
| 7,876,114 B2 | * | 1/2011 | Campbell | G01R 1/06772 333/248 |
| 8,933,707 B1 | * | 1/2015 | Tsironis | G01R 31/2831 324/207.13 |
| 9,322,843 B1 | * | 4/2016 | Tsironis | G01R 1/06772 |
| 9,653,332 B1 | * | 5/2017 | Tsironis | H01L 21/67742 |
| 10,509,053 B2 | * | 12/2019 | Dziczek | G01R 1/06772 |
| 11,480,589 B1 | * | 10/2022 | Tsironis | G01R 1/06788 |

OTHER PUBLICATIONS

"Probe Selection Guide, Infinity Probes" pp. 12-14 [online], FormFactor [retrieved on May 2, 2023]. Retrieved from Internet <URL: formfactor.com /download/probe-selection-guide/?wpdmdl=2561 &refresh=6453bdd267b221683209682>, 50 pages, 2022.

"Model 40M Low Loss Picoprobe" [online], GGB Industries [retrieved on May 2, 2023]. Retrieved from Internet <URL: ggb.com/home/model-40m-low-loss-picoprobe/>, 1 page.

* cited by examiner

*Primary Examiner* — Paresh Patel (57) ABSTRACT

An anti-abrasion wafer probe provides vertical-only probe-tip movement while moved vertically down using the Z-axis of a 3-axis micro-positioner to establish contact with the semiconductor chip on wafer. The vertical-only movement cancels the scratching and abrasion of the chip contact plots, which, in the case of aluminum contact plots, is critical.

4 Claims, 9 Drawing Sheets

ANTI ABRASION WAFER PROBES

PRIORITY CLAIM

N/A

CROSS-REFERENCE TO RELATED ARTICLES

1. "Probe Selection Guide, Infinity Probes" pages 12-14 [online], FormFactor [retrieved on 05/02/2023]. Retrieved from Internet <URL:formfactor.com/download/probe-selection-guide/?wpdmdl=2561&refresh=6453bdd267b221683209682>.
2. "Model 40M Low Loss Picoprobe" [online], GGB Industries [retrieved on 05/02/2023]. Retrieved from Internet <URL: ggb.com/home/model-40m-low-loss-picoprobe/>

BACKGROUND OF THE INVENTION—PRIOR ART

RF and Microwave transistor chips are best characterized "on wafer". This allows avoidance of parasitic connection elements, like wire bonds and fringe capacitors, which are associated with packaging the devices to mount them in test fixtures. It also allows a much larger number of devices to be tested "in situ" without having to laboriously slice the wafer, mount, and wire-bonding each individual chip. The "on wafer" testing is currently the preferred testing method, except for very high-power devices, beyond 20-Watt RF power. On wafer testing is also the exclusive testing method in millimeter-wave frequencies, since device packaging is extremely difficult, and the parasitic elements associated with the package (inductance of wire bonds and fringe capacitors of package housings) would falsify the measured data to the point of uselessness.

Figure 1:
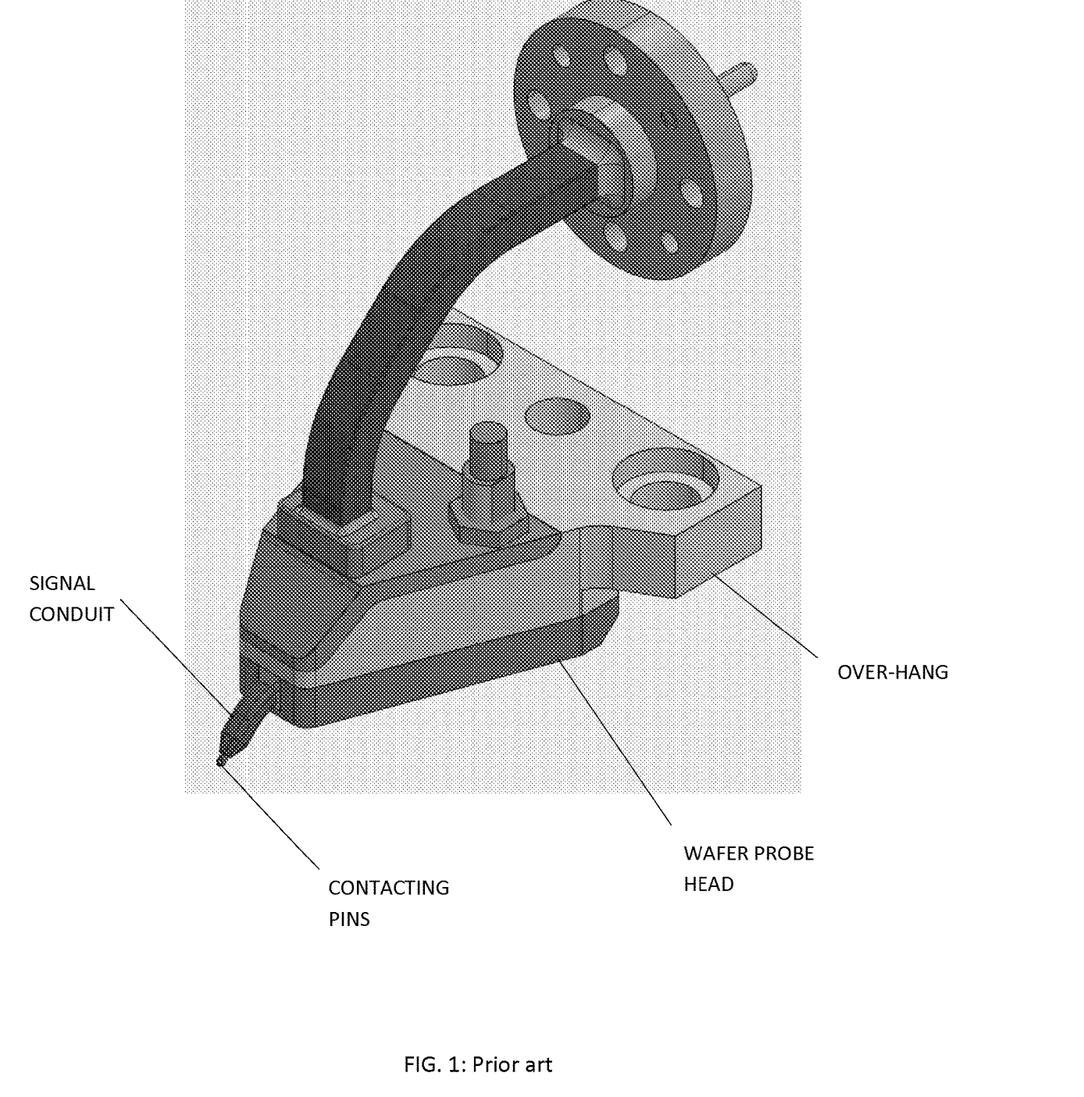
FIG. 1 depicts prior art, a waveguide-to-wafer probe adapter and the used terminology.
Figure 2:
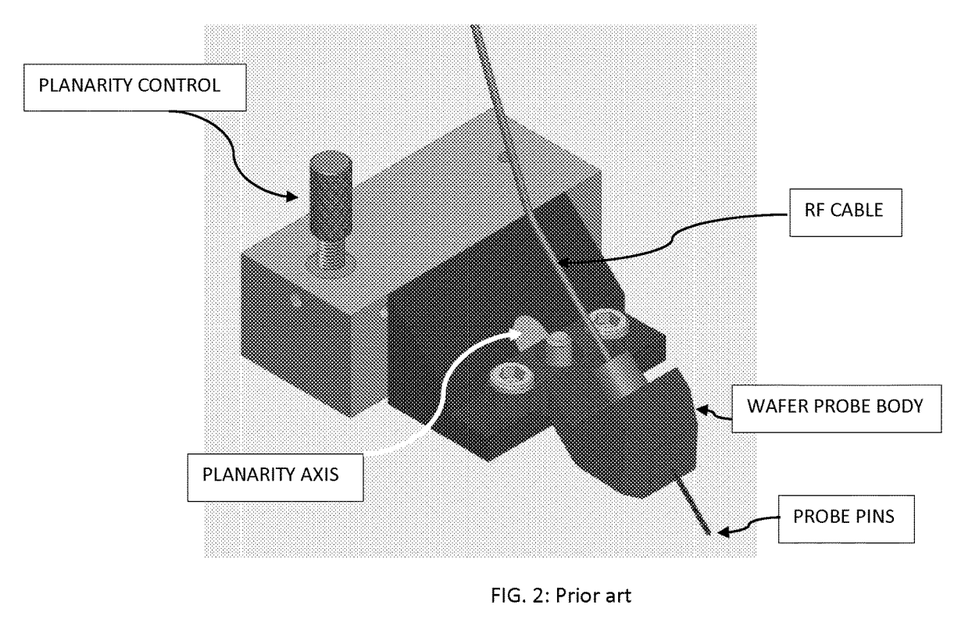
FIG. 2 depicts prior art, planarity (Theta angle) misalignment correction mechanism of wafer probes-to-coaxial RF cable.
Figure 8:
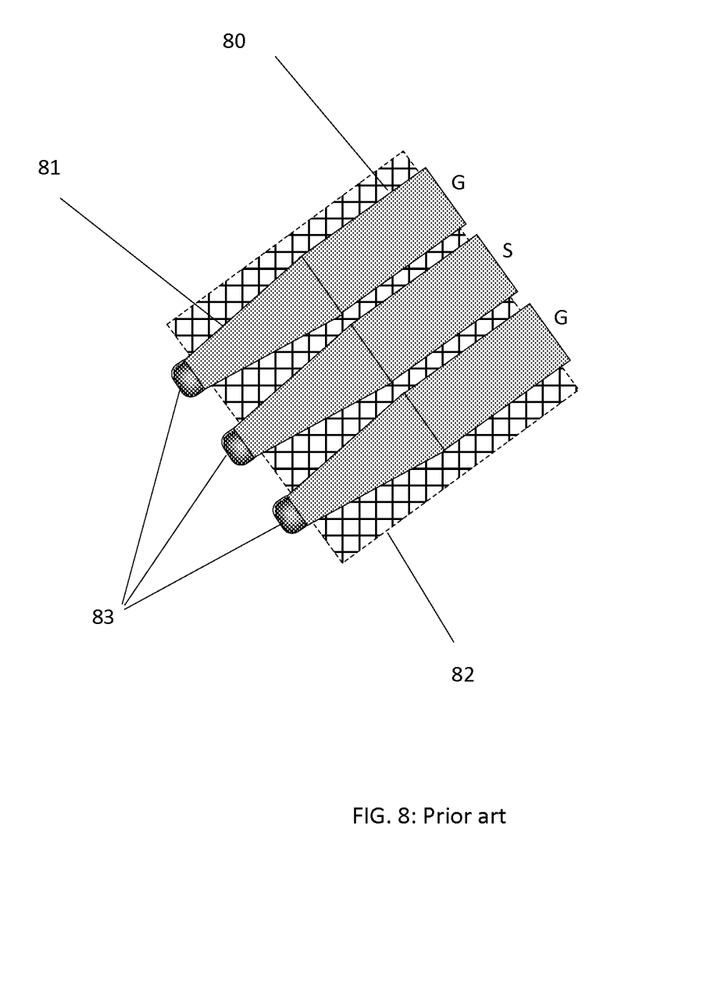
FIG. 8 depicts prior art, a top view of a signal conduit terminating with pure coplanar waveguide structure.

Several manufacturers, see ref. 1, 2, make wafer-probes (FIG. 1) capable of reliably contacting and testing microwave chips on-wafer. The microwave probes (FIGS. 1, 2) are made using small coaxial cables or coplanar waveguide structures with dimensions smaller than 1 mm (0.04"), embedded in a solid body 31, called here the probe-head, which includes an adapter between the signal conduit (coaxial, FIG. 4) or (coplanar FIG. 8) and allows RF energy transfer to auxiliary signal conductors (coaxial or waveguide 30); the coaxial cables themselves also end, towards the chip (DUT), into a "coplanar" structure (FIG. 4), where the center conductor of the coaxial cable becomes the center conductor of the coplanar and the ground mantle of the coaxial cable ends up as the ground plane of the coplanar (FIG. 8). The simple reason for that is that this is a practical way to inject and retrieve the RF signal from the planar layout of the microchips, where all RF (and DC) contacts are on the same surface.

Figure 4:
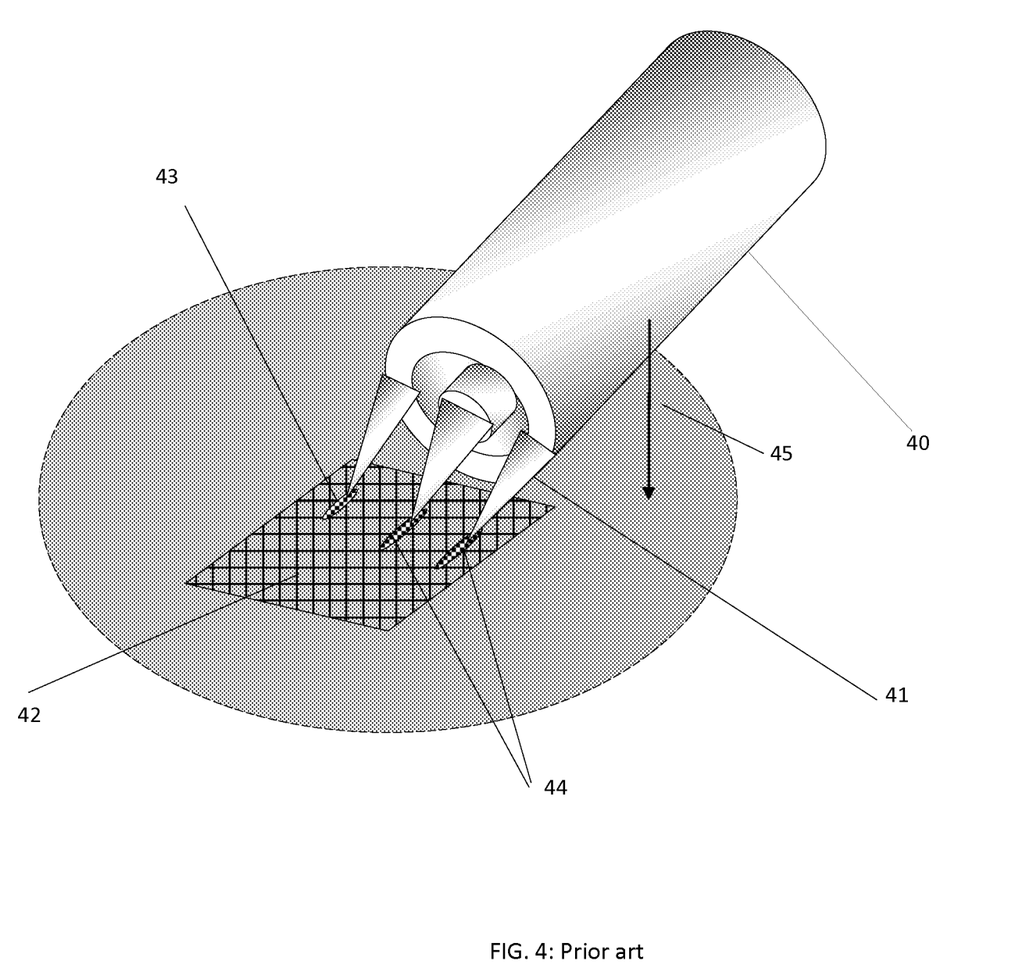
FIG. 4 depicts prior art, a coaxial signal conduit of a wafer probe.

Therefore at least three connection points are necessary to establish a GSG (Ground-Signal-Ground) contact (FIG. 4). Since the tips 41 bend up as the wafer-probe signal conduit 40 moves down 45, they will shift on the chip 42 plots and create scratches like 43, 44, even if the probe tips are perfectly aligned vertically against the wafer 502 and follow the same front line; if the three points do not necessarily form a straight line (FIG. 5B) and since, due to the microscopic structures and manufacturing tolerances, the distance between probe tips is of the order of 100 micrometers (0.004"), it often happens that the contact between the probe tips and chip contact plots is uneven and unreliable and will cause either a long scratch 53 or a shorter scratch 54 (FIG. 5) of the contact pin and completely un-even scratches 55, 56, 57 on the chip (FIG. 5C).

It is therefore necessary to avoid horizontal shift when the probe tips touch down, in particular if they are not on a straight line or the same height. This is feasible by changing the geometry of the wafer-probes and their movement control.

DESCRIPTION OF THE VARIOUS VIEWS OF THE DRAWINGS

The invention and its mode of operation will be more clearly understood from the following detailed description when read with the appended drawings in which:

FIGS. 5A through 5C depict prior art, the mechanics of probe tip shifting and the results.

FIGS. 6A through 6B depict a modified wafer-probe.

DETAILED DESCRIPTION OF THE INVENTION

The problem with contemporary wafer-probes is demonstrated in FIGS. 3, 4 and 5A through 5C: the probe-body 31 is attached via the overhang 32 with the vertical axis of an external 3-axis (X-Y-Z) precision micro-positioner, which places the wafer-probe above the semiconductor chip to be tested using X-Y movements (manual or automatic) and, once in place above the chip, lowers 33 the wafer-probe to establish contact. Originally the signal conduit 37, which must have a certain elasticity to absorb the vertical move tolerance, is oriented under an angle Θ versus the semiconductor wafer 35 (which is shown twice to visualize the relative movement of the wafer probe). The contact occurs at position 38, in which case the signal conduit 37 is pushed up. This movement under the angle Θ causes the tips of the signal conduit 37 (which are usually made of hard tungsten) to slide 36 on the wafer and create scratches or abrasion (item 56 in FIG. 5). If the chip leads are made of gold, this is tolerable, because gold behaves like a fatty liquid; however, if the chip leads are made of a thin aluminum film, this scratching may be catastrophic and at least non-repeatable.

It is therefore important to avoid horizontal movement 36 when lowering the wafer-probe.

Figure 5A:
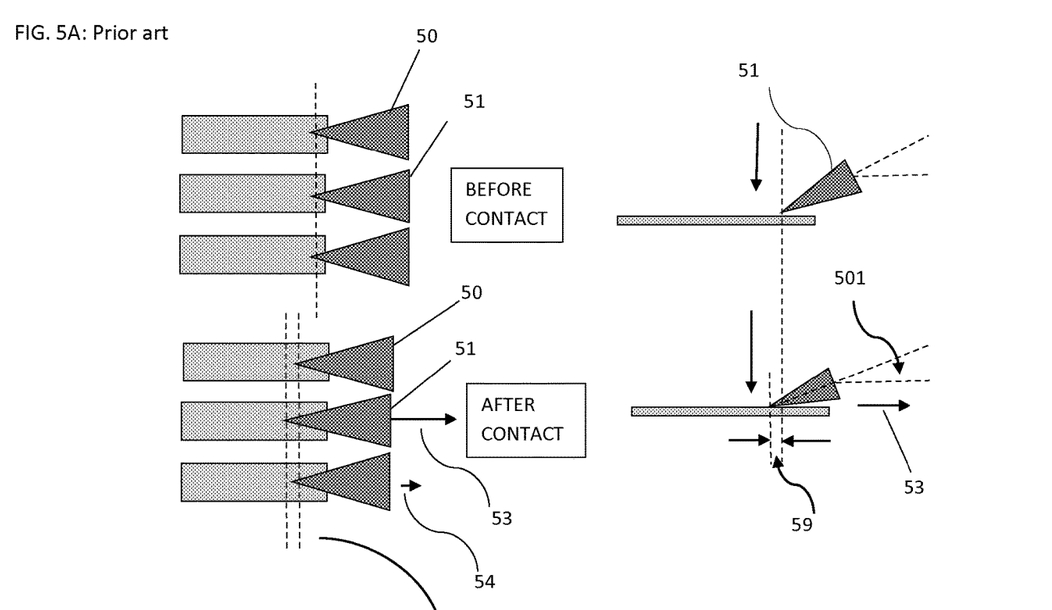
FIG. 5A depicts a top view of the probe tips before (seemingly aligned) and after contact and the shifting caused at touch-down.
Figure 5B:
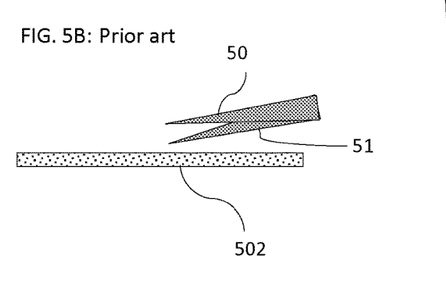
FIG. 5B depicts the vertical misalignment of the probe tips causing the shifting.
Figure 5C:
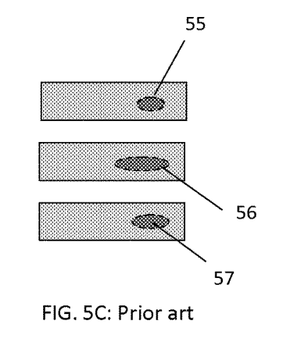
FIG. 5C depicts the marks left by the probe tips after touch-down.

In FIG. 5A through 5C one possible abrasion and contact dislocation mechanism is demonstrated: in the top view of FIG. 5A the probe tips 50, 51 seem aligned. A vertical misalignment of the same probe tips 50 and 51, as shown in FIG. 5B, would be undetectable in the top view; also, a side view, revealing a vertical misalignment as shown in FIG. 5B, is impossible. As shown in FIG. 5A, the probe tip 51, resting below probe tip 50 will touch the wafer before the probe tip 50 and, as the operator moves the wafer-probe deeper to touch also with probe tip 50, the probe tip 51 will slide forward 59 and scratch the surface of the chip. So, depending on the invisible vertical misalignment of FIG. 5B there is a strong possibility of ending up with contact marks as shown by items 55, 56 and 57; a totally unacceptable situation.

Figure 6A:
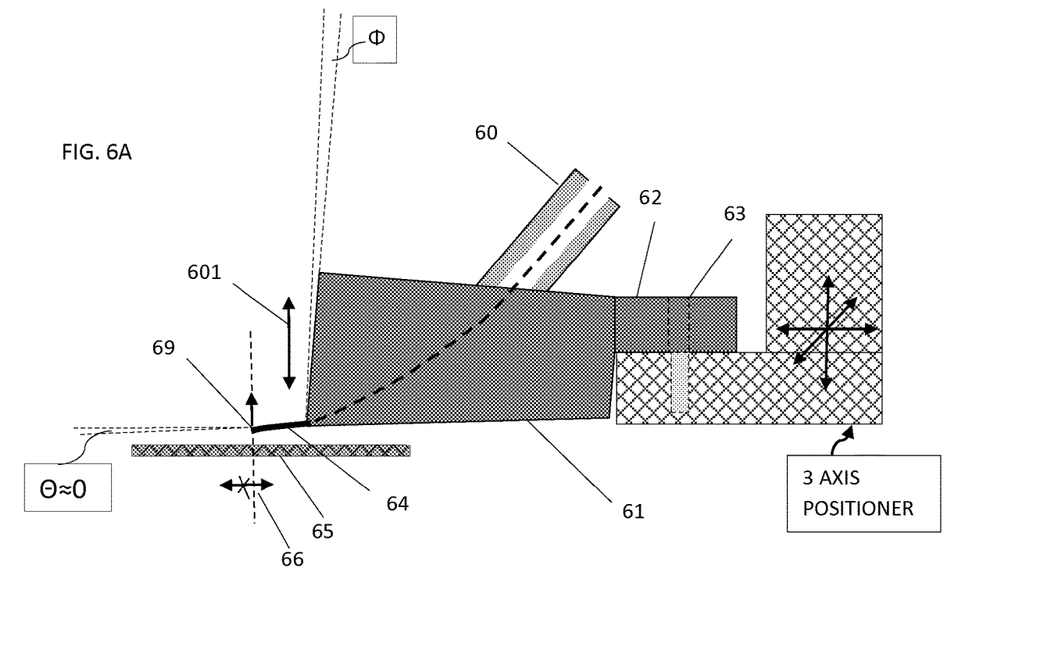
FIG. 6A depicts the modified probe body and signal conduit.
Figure 6B:
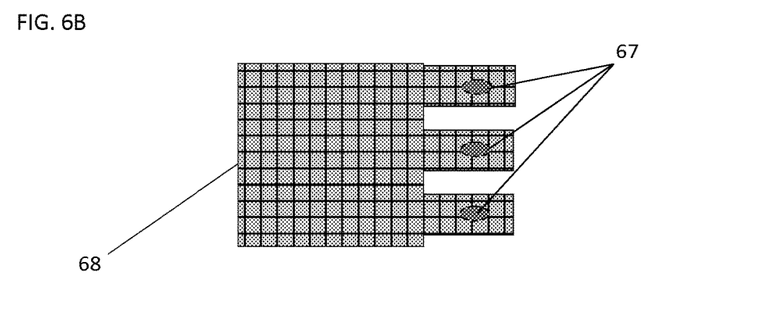
FIG. 6B depicts the marks left by the probe tips after touch-down.

Only when angle 501 becomes close to zero, the marks 55, 56, 57 will be replaced by what is shown in FIG. 6B, i.e., equal marks 67. Another complication with probe-tips appearing from the top apparently aligned, as shown in FIG. 5A, but vertically misaligned, as shown in FIG. 5B is that the probe tip 51 that touches down earlier than the remaining probe-tips, may, in addition to scratching the chip 56, also be pushed back as shown by arrow 53, creating additional contacting and repeatability anomalies.

A possible alleviation of the scratching, probe-tip dislocation and chip abrasion is to avoid 66 the probe tips 69 sliding on the wafer, as they move down 601 when the probe body 62 is pushed down, since the probe is held by a vertical screw 63. This is only possible if the angle $\Theta$ between the signal conduit 64 and the plan of the wafer 65 is zero or close to zero, so that the bending of the signal conduit is only vertical. To get to this point the wafer-probes, as they are available now (FIG. 1, 3) must be modified: the signal conduit 64 must be bent upwards as much as possible, to run almost parallel to the wafer 65 ($\Theta \approx 0$), this will create a conflict with the body 61 of the wafer-probe, which must also be inclined and, because the body 31 is much longer than the signal conduit 64, it will touch the surface of the wafer before the probe-tips. Therefore, the bottom of a body 61 must be wedge-tailored to allow this inclining without touching the wafer before the probe-tips. This means the signal outgoing conductor 60 will also be adjusted under an angle $\Phi$. However, since the 3-axis positioner operates purely vertically 63, this inclination must be made by modifying the attachment of the overhang 62 to the body 61 under an appropriate angle $\Phi$. If the modifications are performed accurately, then a homogenous overall contacting scheme will appear as shown in FIG. 6B, where the contact plots of the chip 68 show equal marks 67.

Figure 3:
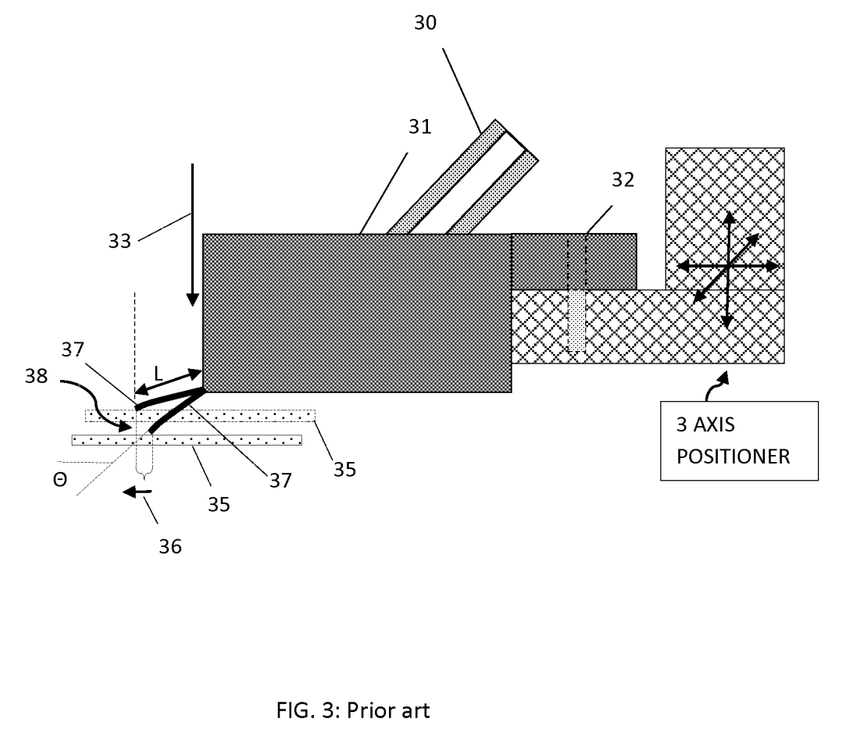
FIG. 3 depicts prior art, the mechanism of probe touchdown causing shifting of the probe tip and abrasion on the semiconductor chip.
Figure 7:
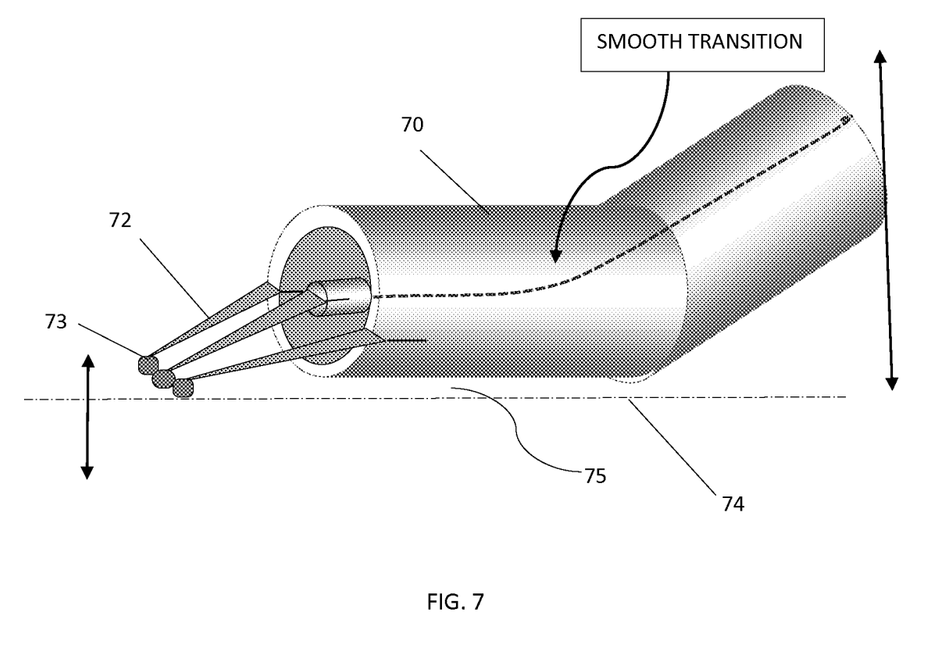
FIG. 7 depicts a modified coaxial signal conduit bent to run parallel to the semiconductor wafer and to allow vertical-only movement and abrasion-free contact.
Figure 9:
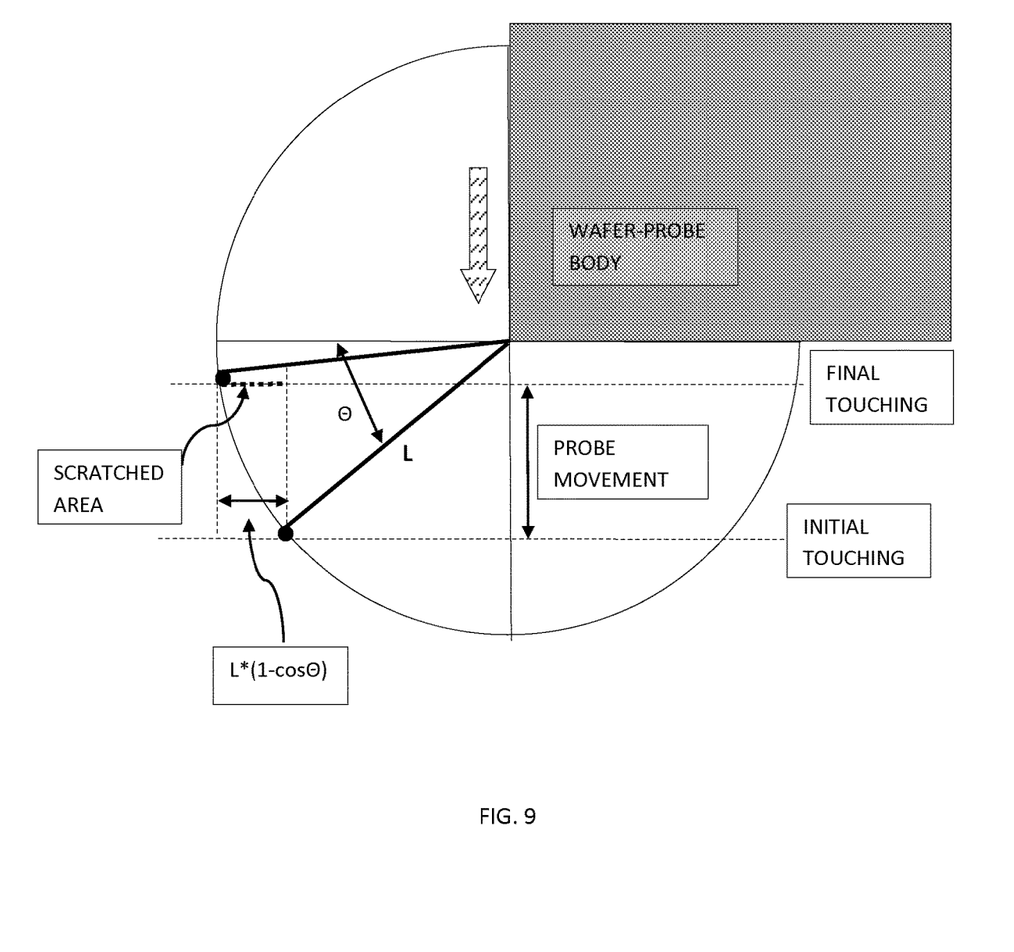
FIG. 9 depicts a simple geometrical relationship between the slope angle Θ of the signal conduit (L) and the scrapping range upon contacting with the chip.

A detail on a required modification of the coaxial signal conduit is shown in FIG. 7: the section of the coaxial cable 70 is bent upwards at the end to run parallel to the semiconductor wafer 74; at the same time the contact leads 72 are equipped with contact blobs 73 (usually made of tungsten against wear out) and will move quasi vertical since the length L of the contact leads 72 is normally very short and the move is purely tangential. If the section 70 were a straight extension of the cable, then the shift (and abrasion) 36 or 59 on the wafer would be several times bigger, following a ratio of $L*(1-\cos(\Theta))$ (FIGS. 3 and 9). In FIG. 9 it becomes obvious that the larger the free space 75 under the probe body (angle $\Theta$), the longer the scratched area becomes: $L*(1-\cos \Theta)$. There is a compromise between the clearance between the probe body and the wafer surface for safe movement and the potentially scratched section.

Finally, FIG. 8 shows the end section 81 of a coplanar structure 80, which is manufactured on a somehow elastic dielectric substrate 82 to allow for reliable contact of the blobs 83 with the contact plots of the chip; this manufacturing method, when made photo-lithographically, allows better control of front line and height planarity than the coaxial structure of FIG. 7, which is made manually but offers higher elasticity.

Obvious alternative embodiments of the anti-abrasion wafer probe shall not erode and infringe on the basic idea of modifying existing or designing new RF and microwave wafer-probes for abrasion-free chip contacting by ensuring vertical-only movement of the probe tips.

What is claimed is:

1. A wafer-probe for low-loss abrasion-free contacting a chip on a semiconductor wafer comprises: a signal transmission line to the chip having at least three contact pins,
   a probe-head having a body and a fastening overhang,
   a suitable mounting of the overhang to the body of the probe-head, wherein,
   the signal transmission line is bent to run parallel to the semiconductor wafer, and
   the body of the probe-head is wedge tailored at the bottom and inclined relative to the semiconductor wafer to run parallel with the signal transmission line and to allow the contact pins of the signal transmission line to protrude slightly towards the semiconductor wafer, and
   the overhang is attached to the body of the probe-head under an angle allowing the overhang to be parallel to the semiconductor wafer,
   and wherein
   the overhang is attached to a vertical axis of a 3-axis micro positioner, and
   wherein
   a vertical movement of the wafer probe-head establishes vertical-only and abrasion-free contact of the pins with the chip on the semiconductor wafer.

2. The wafer-probe of claim 1 wherein
   the signal transmission line is a coaxial cable with at least three contacting fingers, and wherein
   each contacting finger has a front tip for securely contacting the chip on the semiconductor wafer.

3. The wafer-probe of claim 1 wherein
   the signal transmission line is a coplanar waveguide with at least three contacting fingers, and wherein
   each contacting finger has a bottom tip at its front edge for making contact securely with the chip on the semiconductor wafer.

4. The wafer-probe of claim 1 wherein
   the tips of the contact pins of the signal transmission line below the body of the probe-head allows secure contact with the chip before the bottom of the probe head touches the semiconductor wafer.

* * * * *